T. J. LOVE.
CORN HARVESTER.
APPLICATION FILED OCT. 24, 1910.
1,006,243.
Patented Oct. 17, 1911.
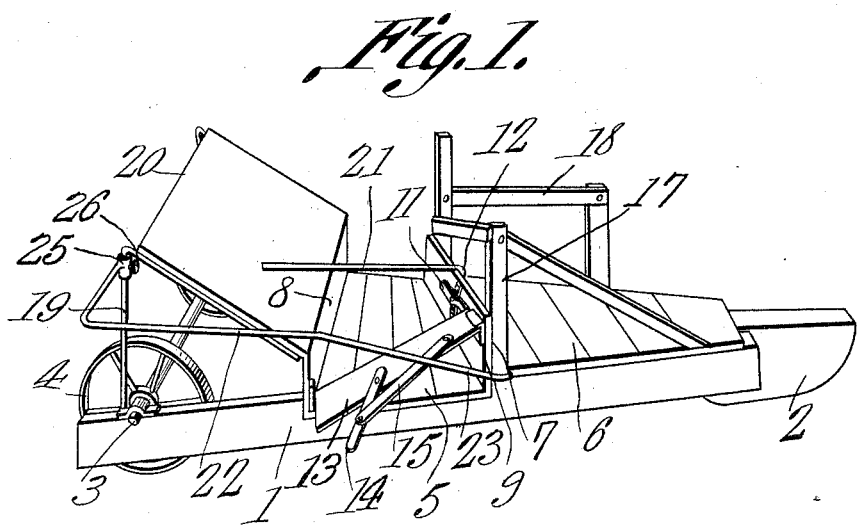
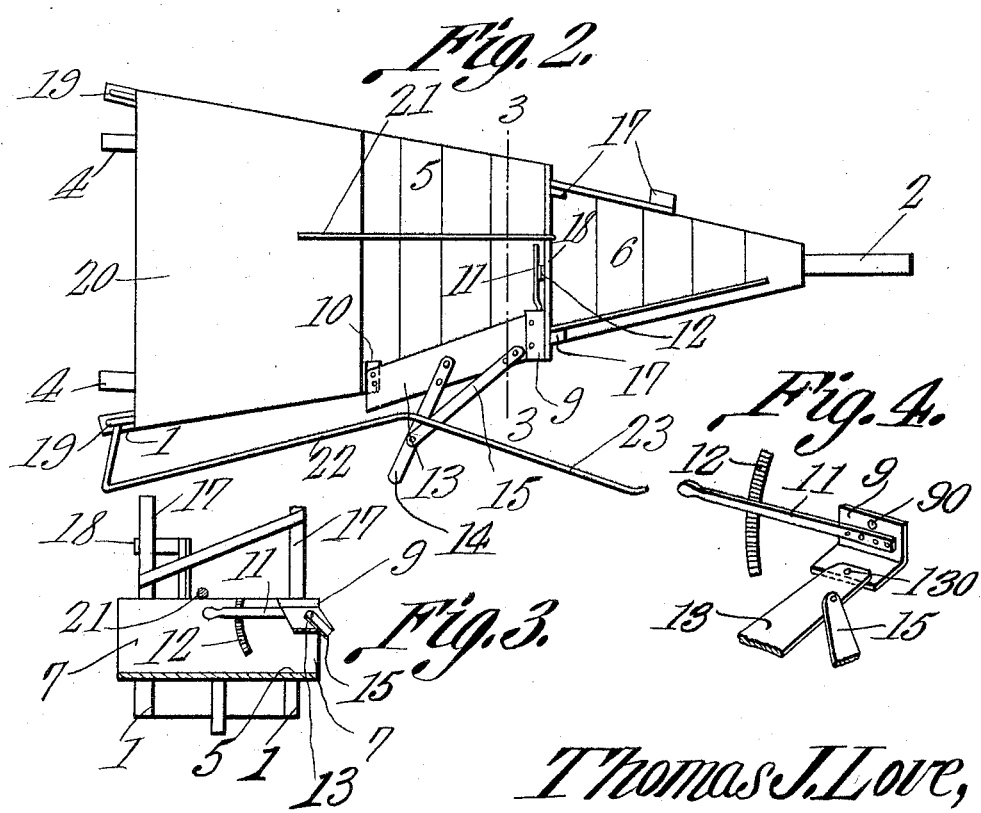
Witnesses
Thomas J. Love,
Inventor
by C. A. Snow & Co.
Attorneys

UNITED STATES PATENT OFFICE.

THOMAS J. LOVE, OF LINCOLN, ILLINOIS.

CORN-HARVESTER.

1,006,243.

Specification of Letters Patent.

Patented Oct. 17, 1911.

Application filed October 24, 1910. Serial No. 588,761.

*To all whom it may concern:*

Be it known that I, THOMAS J. LOVE, a citizen of the United States, residing at Lincoln, in the county of Logan and State of Illinois, have invented a new and useful Corn-Harvester, of which the following is a specification.

This invention relates to corn harvesters and consists in the novel construction and arrangement of its parts as hereinafter shown and described.

The present invention is an improvement over the structure shown in my prior patent issued November 16, 1909, No. 940,171.

The object of the present invention is to provide in a corn harvester means for straightening and holding the stalks against cutting blades and means for tilting the outer end portion of the cutting blade in an upward or downward direction to give the stalks shearing cuts. The invention also includes other structural details which will be pointed out hereinafter.

In the accompanying drawings: Figure 1 is a perspective view of the corn harvester. Fig. 2 is a top plan view of the same. Fig. 3 is a transverse sectional view of the same cut on the line 3—3 of Fig. 2. Fig. 4 is a perspective detail showing the manner of pivoting one of the angle irons.

The corn harvester consists of side beams 1 which converge toward each other at their forward ends and between the forward ends of which is secured the runner 2. The draft animal may be attached to the runner 2 in any appropriate manner. The rear ends of the beams 1 are supported by a transversely disposed axle 3 which in turn is mounted upon ground wheels 4. In front of the wheels 4 the beams 1 support platforms 5 and 6, the former being at or about the middle of the harvester and the latter at the front end thereof.

The platform 5 is located relatively close to the ground by reducing the height of the intermediate portions of beams 1 on which the said platform is mounted. By locating the platform 5 close to the ground it is easy to get on and off, and it gives a greater range for adjusting the knife to be described presently. At the front end of the platform 5 is mounted an upright and transversely extending board 7. A transversely disposed board 8 is located at the rear edge of the platform 5. Sections of angle irons 9 and 10 are pivotally mounted at 90 upon the boards 7 and 8, respectively, in the vicinity of the receiving end of the platform 5 and a resilient handle or lever 11 is fastened to the angle iron 9 and is adapted to engage a series of teeth 12, or their equivalent mounted upon the board 7. By grasping the resilient lever 11 and disengaging the same from the teeth 12 it is apparent that the angle irons 9 and 10 may be swung upon their pivots through the instrumentality of a plate or bar 13 whose extremities are pivotally connected with said angle irons at 130, thereby permitting the irons and bar to turn simultaneously although the latter stands oblique and the pivot 90 of the front iron 9 at the board 7 is higher than the pivot of the rear iron 10 to the board 8. The bar 13 is made to stand inclined in order that the knife blades carried thereby will have a shear cut as will be understood. After the lever 11 has been moved so that the bar and both angle irons are pitched at a desired angle the said lever 11 may be permitted to engage the teeth 12 whereby the parts will be held in adjusted position. A knife blade 14 is fixed at one end to the bar 13 and extends beyond the edge thereof at an acute angle to the edge of the said bar. A knife blade 15 is attached at one end to the bar 13 and at its outer end is attached to the intermediate portion of the knife blade 14. Upwardly disposed standards 17 are mounted upon the forward portions of the beams 1 and are connected together by means of rails 18. Standards 19 are mounted upon the rear end portions of the beams 1 and support the rear edge of a fender 20. The said fender is in inclined position with its forward edge resting upon or joined with the upper edge portion of the board 8 and the said fender serves as a means for protecting the wheels 4 from the corn as it is being cut and may also be used as a means for mounting the butt ends of several stalks together in order to have the butt ends of the stalks in the common plane to form a bundle. This is done by an operator who stands upon the platform 5.

A brace or rod 21 is connected at its forward end with the board 7 and at its rear end with the fender 20 and extends longitudinally across the platform 5 and serves as means for preventing the operator from coming too close to the knives 14 and 15 and also serves as means for bracing the parts of the structure with which it is connected.

A stalk lifting and spacing arm 22 has a collar 25 adjustably attached at its rear end to one of the standards 19 by a set screw 26 and projects forwardly along the side of the harvester to a point approximately at the rear end of the platform 5 then the said arm 22 diverges outwardly and is disposed at an angle to the adjacent beams 1. The outwardly disposed portion of the said arm 22 is indicated at 23 and the inner end portion of the said outwardly disposed portion 23 is adapted to encounter leaning stalks and straighten the same up and also directs the stalks toward the cutting edges of the knives 14 and 15 as the harvester is drawn along a row of standing stalks. Furthermore the arm 22 will serve as a guard for preventing the draft animal from backing upon the knives 14 and 15. As the stalks are cut by being brought in contact with the knives 14 and 15, the operator grasps the stalks and accumulates them in bundles upon the platform. It will be understood that the machine is drawn forward alongside a row of standing corn, and so guided that the standing stalks of corn pass into the angle between the deflected portion 23 of the arm 22 and the adjacent side of the platform. As the machine progresses the knife 15 is drawn against the stalk and usually the latter will be severed thereby because of the oblique position of the knife both as to the line of draft and as to a horizontal; but should the stalk resist the action of this knife it passes farther to the rear and strikes the outer end of the knife 14 which it will be observed stands at a greater angle to the line of draft.

In the following claims, I have referred to certain elements as "angle irons". The term "angle irons" is intended to be descriptive of the shapes of these members, and is not to be taken as a term of limitation, indicating that these members must, of necessity, be fashioned from iron.

Having described the invention what I claim as new and desire to secure by Letters Patent is:

1. A corn harvester comprising a frame having a cross platform, upright boards across the frame in front and in rear of said platform, angle irons pivoted to said boards at different heights, an operating lever connected with one angle iron, a ratchet on the board to which the last named iron is pivoted, with which ratchet the lever engages, a bar pivotally connected at its ends with said angle irons and itself standing obliquely to the platform, a knife blade connected to the forward portion of this bar and inclined to the rear, a second knife blade connected to said bar at a point farther to the rear and connected to the outer end of the first-mentioned blade, and an arm connected with the rear portion of the frame and having its front end directed obliquely outward above said knives.

2. A corn harvester comprising a frame having a cross platform, upright boards across the frame in front and in rear of said platform, angle irons pivoted to said boards, an operating lever connected with one angle iron, a ratchet on the board to which the last named angle iron is pivoted, with which ratchet the lever engages, a bar pivotally connected at its ends with said angle irons, a knife blade connected to the forward portion of this bar and inclined to the rear, a second knife blade connected to said bar at a point farther to the rear and connected to the outer end of the first-mentioned blade, and an arm adjustably connected with the rear portion of the frame and having its front end directed obliquely outward above said knives.

In testimony that I claim the foregoing as my own, I have hereto affixed my signature in the presence of two witnesses.

THOMAS J. LOVE.

Witnesses:
OSCAR K. MOHR,
CHAS. A. RATHBONE.